United States Patent
Gandhi et al.

(10) Patent No.: US 12,015,669 B2
(45) Date of Patent: Jun. 18, 2024

(54) DYNAMIC OPEN RADIO ACCESS NETWORK RADIO UNIT SHARING BETWEEN MULTIPLE TENANT OPEN RADIO ACCESS NETWORK DISTRIBUTED UNITS

(71) Applicant: Cisco Technology, Inc., San Jose, CA (US)

(72) Inventors: Indermeet Gandhi, San Jose, CA (US);
Mark Grayson, Maidenhead (GB);
Shailender Potharaju, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/047,828

(22) Filed: Oct. 19, 2022

(65) Prior Publication Data
US 2024/0137414 A1    Apr. 25, 2024

(51) Int. Cl.
*H04L 67/1097*    (2022.01)
*H04W 72/04*    (2023.01)

(52) U.S. Cl.
CPC ......... *H04L 67/1097* (2013.01); *H04W 72/04* (2013.01)

(58) Field of Classification Search
CPC ........... H04L 67/1097; H04L 27/0006; H04W 16/14; H04W 72/04; H04W 72/12
See application file for complete search history.

(56) References Cited

U.S. PATENT DOCUMENTS

| | | | | |
|---|---|---|---|---|
| 8,548,514 B2 * | 10/2013 | Kim | ...................... | H04L 5/0048 |
| | | | | 455/515 |
| 9,144,079 B1 * | 9/2015 | Marupaduga | ......... | H04W 24/00 |
| 10,034,292 B1 * | 7/2018 | Liu | .................... | H04W 72/0446 |
| 10,298,375 B2 * | 5/2019 | Faronius | ............... | H04L 5/0087 |
| 10,425,829 B1 * | 9/2019 | Cui | ......................... | H04W 16/14 |
| 11,601,379 B1 * | 3/2023 | Cai | ......................... | H04L 43/16 |

(Continued)

FOREIGN PATENT DOCUMENTS

| | | | |
|---|---|---|---|
| CN | 102905375 A | * | 1/2013 |
| CN | 103716888 A | * | 4/2014 |

(Continued)

*Primary Examiner* — Shean Tokuta
(74) *Attorney, Agent, or Firm* — Merchant & Gould P.C.

(57) ABSTRACT

Dynamic Open Radio Access Network Radio Unit (O-RU) sharing between multiple tenant Open RAN Distributed Units (O-DU) may be provided. A Near Real Time RAN Intelligent Controller (nRT-RIC) may receive tenant policies for a first tenant and a second tenant. The nRT-RIC may then determine initial sharing templates for the first tenant and the second tenant based on the tenant policies. The nRT-RIC may send the initial sharing templates to a first tenant Distributed Unit (DU) and a second tenant DU. The nRT-RIC may receive operating metrics from the first tenant DU and the second tenant DU. The nRT-RIC may then determine operational factors based on the operating metrics. The nRT-RIC may alter an allocation of resources between the first tenant and the second tenant based on the operational factors. Finally, the nRT-RIC may send the altered allocation of resources to the first tenant DU and the second tenant DU.

20 Claims, 4 Drawing Sheets

(56) References Cited

U.S. PATENT DOCUMENTS

| | | | | |
|---|---|---|---|---|
| 2011/0267967 | A1* | 11/2011 | Ratasuk | H04L 5/0053 |
| | | | | 370/252 |
| 2015/0319741 | A1* | 11/2015 | Li | H04W 72/044 |
| | | | | 370/329 |
| 2017/0079070 | A1* | 3/2017 | Lu | H04L 5/0053 |
| 2018/0184331 | A1* | 6/2018 | Samdanis | H04W 28/16 |
| 2019/0124664 | A1* | 4/2019 | Wang | H04W 72/52 |
| 2020/0296741 | A1* | 9/2020 | Ayala Romero | H04W 16/12 |
| 2020/0344663 | A1* | 10/2020 | Dowlatkhah | H04W 40/04 |
| 2020/0389908 | A1* | 12/2020 | Shabbo | H04B 7/0456 |
| 2021/0234648 | A1* | 7/2021 | Parekh | H04W 72/04 |
| 2021/0235473 | A1* | 7/2021 | Parekh | H04W 72/542 |
| 2021/0258924 | A1* | 8/2021 | Jose | H04W 28/16 |
| 2021/0314774 | A1* | 10/2021 | Van Phan | H04W 12/08 |
| 2021/0321368 | A1* | 10/2021 | Sarkis | H04L 5/0094 |
| 2021/0385686 | A1* | 12/2021 | Ahmed | H04W 24/02 |
| 2022/0086095 | A1* | 3/2022 | Sharma | H04L 47/24 |
| 2022/0191873 | A1* | 6/2022 | Yang | H04W 28/24 |
| 2022/0210794 | A1* | 6/2022 | Pietrzyk | H04W 72/121 |
| 2022/0256551 | A1* | 8/2022 | Atawia | H04W 72/1215 |
| 2022/0264525 | A1* | 8/2022 | Simon | H04W 72/30 |
| 2022/0272574 | A1* | 8/2022 | Wen | H04W 28/0862 |
| 2022/0338300 | A1* | 10/2022 | Sun | H04W 28/08 |
| 2022/0400385 | A1* | 12/2022 | Eklund | H04W 16/14 |
| 2023/0021194 | A1* | 1/2023 | Grayson | H04W 68/02 |
| 2023/0034500 | A1* | 2/2023 | La Roche | H04W 72/0453 |
| 2023/0036652 | A1* | 2/2023 | Damnjanovic | H04W 28/16 |
| 2023/0038515 | A1* | 2/2023 | Nam | H04W 52/0216 |

FOREIGN PATENT DOCUMENTS

| | | | | |
|---|---|---|---|---|
| CN | 103716888 | B | * | 4/2017 |
| CN | 107124772 | A | * | 9/2017 ........... H04L 5/0053 |
| CN | 109040151 | A | * | 12/2018 ......... B61L 27/0038 |
| FR | 3089087 | A1 | * | 5/2020 ........... H04W 28/20 |
| JP | 2002034070 | A | * | 1/2002 |
| KR | 20130004847 | A | * | 1/2013 |
| TW | 1787095 | B | * | 12/2022 |
| WO | WO-2015113286 | A1 | * | 8/2015 ........... H04W 56/00 |
| WO | WO-2016198104 | A1 | * | 12/2016 .......... H04W 28/16 |
| WO | WO-2017085534 | A1 | * | 5/2017 ........... H04L 1/0001 |
| WO | WO-2018031664 | A1 | * | 2/2018 ....... H04L 27/26025 |
| WO | WO-2021015944 | A1 | * | 1/2021 ........ H04B 7/18513 |
| WO | WO-2021019517 | A1 | * | 2/2021 ........... H04W 16/14 |
| WO | WO-2021201522 | A1 | * | 10/2021 |
| WO | WO-2022005361 | A1 | * | 1/2022 |
| WO | WO-2023283086 | A1 | * | 1/2023 ........... H04W 68/02 |
| WO | WO-2023005561 | A1 | * | 2/2023 |

\* cited by examiner

DYNAMIC OPEN RADIO ACCESS NETWORK RADIO UNIT SHARING BETWEEN MULTIPLE TENANT OPEN RADIO ACCESS NETWORK DISTRIBUTED UNITS

TECHNICAL FIELD

The present disclosure relates generally to providing dynamic Open Radio Access Network Radio Unit (O-RU) sharing between multiple tenant Open Radio Access Network Distributed Units (O-DU).

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
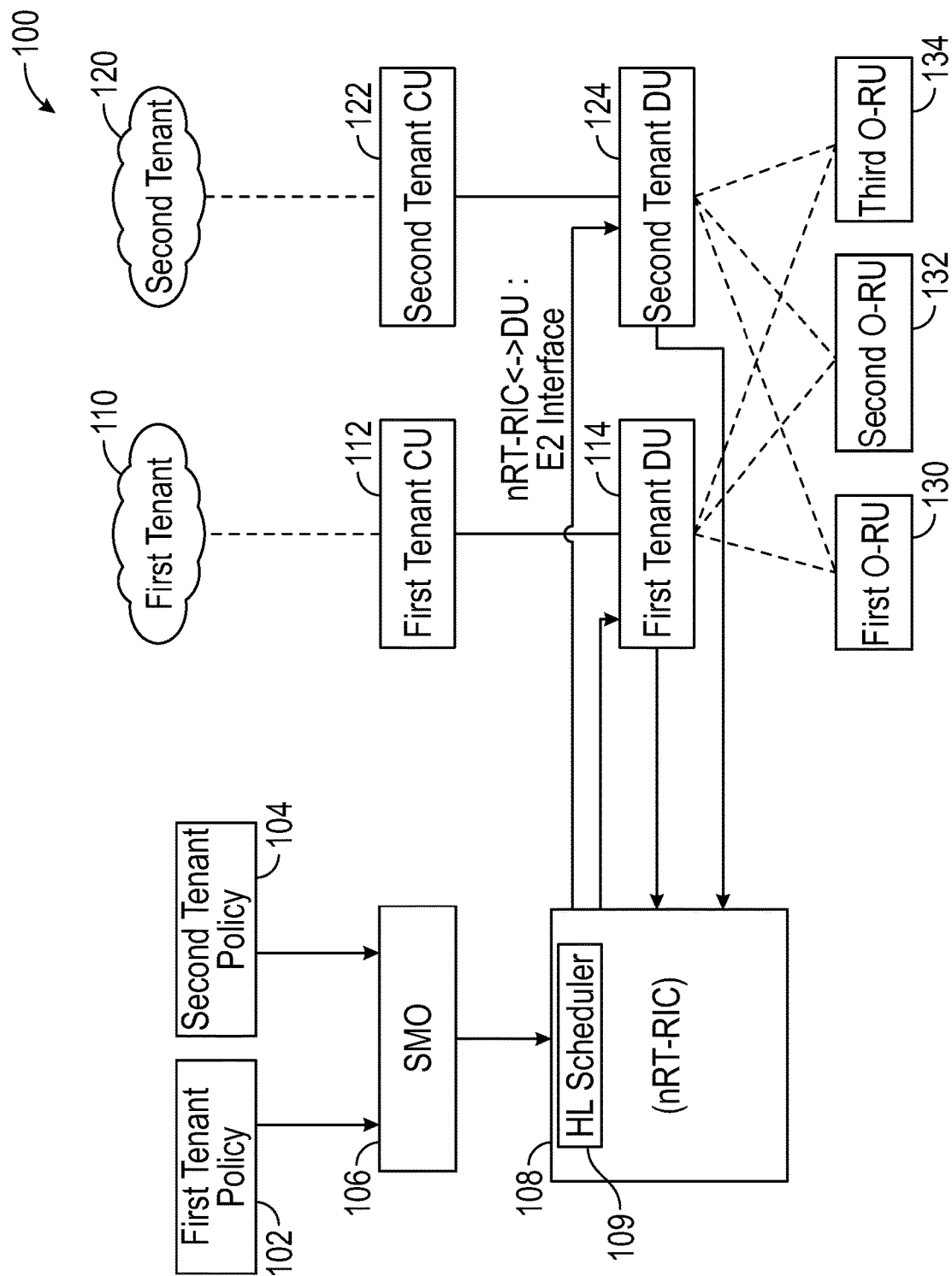
FIG. 1 is a block diagram of an operating environment for providing dynamic Open Radio Access Network Radio Unit (O-RU) sharing between multiple tenant Open Radio Access Network Distributed Units (O-DU)

Dynamic Open Radio Access Network Radio Unit (O-RU) sharing between multiple tenant Open Radio Access Network Distributed Units (O-DU) may be provided. A Near Real Time Radio Access Network Intelligent Controller (nRT-RIC) may receive tenant policies for a first tenant and a second tenant. The nRT-RIC may then determine initial sharing templates for the first tenant and the second tenant based on the tenant policies. The nRT-RIC may send the initial sharing templates to a first tenant Distributed Unit (DU) and a second tenant DU. The nRT-RIC may then receive operating metrics from the first tenant DU and the second tenant DU. Next, the nRT-RIC may determine operational factors based on the operating metrics. The nRT-RIC may alter an allocation of resources between the first tenant and the second tenant based on the operational factors. Finally, the nRT-RIC may send the altered allocation of resources to the first tenant DU and the second tenant DU.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Disaggregated Radio Area Networks (RAN) may provide the option to virtualize higher layer RAN functions and may provide new operational features for shared operators (e.g., Mobile Network Operators (MNOs)) providing services to tenants. When shared operators statically share resources, RAN resources may be over-provisioned. Current Open RAN Radio Unit (O-RU) sharing mechanisms may not cover a process for dynamically sharing resources and instead only cover the static allocation of carriers to individual tenant operators. A dynamic sharing method may be desirable for assigning shared RU resources in a disaggregated RAN architecture between tenants. Furthermore, shared operators may not have mechanisms to dynamically share resources without direct interfacing between Open RAN Distributed Units (O-DU).

FIG. 1 is a block diagram of an operating environment 100 for providing dynamic O-RU sharing between multiple tenant O-DUs. The operating environment 100 may include a first tenant policy 102, a second tenant policy 104, a Service Management and Orchestration (SMO) 106, Near Real Time RAN Intelligent Controller (nRT-RIC) 108. Operating environment 100 may further include a first tenant 110, a first tenant Centralized Unit (CU) 112, a first tenant DU 114, a second tenant 120, a second tenant CU 122, a second tenant DU 124, a first O-RU 130, a second O-RU 132, and a third O-RU 134. There may be more or fewer systems in the operating environment 100 in other examples, such as more or tenants, more or fewer O-RUs, multiple nRT-RICs, and the like.

The first tenant policy 102 may include policy information for the first tenant 110, such as a Service Level Agreement (SLA), a slice descriptor, and the like. The second tenant policy 104 may include policy information for the second tenant 120. The SMO 106 may receive the first tenant policy 102 and the second tenant policy 104 and provide the first tenant policy 102 and the second tenant policy 104 to the nRT-RIC 108. The nRT-RIC 108 may use the first tenant policy 102 and the second tenant policy 104 to instantiate a sharing policy and a carrier and Physical Resource Block (PRB) allocation scheme. For example, the nRT-RIC 108 may determine the resources the first tenant 110 and the second tenant 120 may use when interfacing with the first O-RU 130, the second O-RU 132, and/or the third O-RU 134.

The nRT-RIC 108 may include a scheduler 109 that may use an inter-tenant arbiter function, and the nRT-RIC 108 may use the inter-tenant arbiter function to perform a partitioning of scheduling resources between tenant scheduler instances. The inter-tenant arbiter function may operate at the sub-frame level. In another example, the inter-tenant arbiter function may operate on time scales greater than sub-frame timing. The inter-tenant arbiter function may be a part of another system in other examples.

The first tenant DU 114 and the second tenant DU 124 may use a multi-vendor scheduling function that may leverage the E2 interface, that the nRT-RIC 108 may use to control RAN elements, to communicate with the nRT-RIC 108. The first tenant DU 114 and the second tenant DU 124 may not need to directly interact with each other for the nRT-RIC 108 to determine a dynamic allocation of resources provided by the first O-RU 130, the second O-RU 132, and the third O-RU 134 between the first tenant 110 and the second tenant 120.

The nRT-RIC 108, using the scheduler 109 for example, may create an initial sharing template for each tenant and send the initial sharing template to the DU of the respective tenant, the first tenant DU 114 and the second tenant DU 124 for example. The initial sharing templates may define the resources a respective tenant is allocated. The nRT-RIC 108 may create the initial sharing templates proportionally between tenants based on the expected needs of the tenants. The nRT-RIC 108 may use the first tenant policy 102 and the second tenant policy 104 to determine the initial sharing templates for the first tenant 110 and the second tenant 120. For example, the first tenant policy 102 and the second tenant policy 104 may indicate that the first tenant 110 and the second tenant 120 both have the same characteristics, such as the same slice descriptor (e.g., enhanced Mobile Broadband (eMBB)), and the scheduler 109 may split the resources equally based on the first tenant policy 102 and the second tenant policy 104 indicating the same characteristics.

The nRT-RIC 108 may also communicate with the first tenant CU 112 and the second tenant CU 122 to determine the component and operation information (e.g., real time load instrumentation) of the first tenant 110 and the second tenant 120. Therefore, the scheduler 109 may use the characteristics defined by the first tenant policy 102 and the second tenant policy 104 and the components and operation of the first tenant 110 and the second tenant 120 received from the first tenant CU 112 and the second tenant CU 122 to determine the initial sharing templates for the first tenant 110 and the second tenant 120.

Once the first tenant DU 114 and the second tenant DU 124 receive the respective initial sharing template, the first tenant DU 114 and the second tenant DU 124 may cause the first tenant 110 and the second tenant 120 respectively to operate using the resources the tenants are allocated according to the initial sharing templates. For example, the first tenant DU 114 and the second tenant DU 124 may implement traffic policies and Quality of Service (QoS) policies for the first tenant 110 and the second tenant 120 based on the initial sharing templates. The first tenant DU 114 and the second tenant DU 124 may use the multi-vendor scheduling function to cause the first tenant 110 and the second tenant 120 to operate according to the initial sharing templates.

The first tenant DU 114 and the second tenant DU 124 may monitor the operation of the first tenant 110 and the second tenant 120 respectively. For example, the first tenant DU 114 and the second tenant DU 124 may determine operating metrics such as the number of scheduled active users per Transmission Time Interval (TTI), the downlink PRB occupation rate, the uplink PRB occupation rate, Control Channel Element (CCE) utilization, Radio Link Control (RLC) buffer status, Modulation and Coding Scheme (MCS) distribution, and the like. The first tenant DU 114 and the second tenant DU 124 may send the operating metrics to the nRT-RIC 108 for each period interval, via the E2 interface for example.

For each interval the nRT-RIC 108 receives operating metrics, the nRT-RIC 108, using the scheduler 109 for example, the nRT-RIC 108 may determine operational factors for each tenant. The operational factors may include the change in the number of users, the utilization and traffic, and the scheduling capacity that is not utilized for example, for the first tenant 110 and the second tenant 120. The nRT-RIC 108 may adjust the allocation of resources between the first tenant 110 and the second tenant 120 based on the operational factors. For example, the first tenant 110 may have an increase in the number of users, high utilization and traffic, and is utilizing all scheduling capacity, and the second tenant 120 may have a decrease in the number of users and is not utilizing all scheduling capacity. Thus, nRT-RIC 108 may determine to alter the allocation to provide more resources to the first tenant 110 and less resources to the second tenant 120. The second tenant 120 may still have access to sufficient resources to operate effectively for the number of users and utilization and traffic the second tenant 120 is handling. The nRT-RIC 108 may alter the allocation by providing additional TTIs to one tenant and/or providing fewer TTIs to another tenant. Altering the allocation may include altering the sharing policy and/or altering the carrier and Physical Resource Block (PRB) allocation scheme. For example, the nRT-RIC 108 may alter the resources the first tenant 110 and the/or the second tenant 120 may use when interfacing with the first O-RU 130, the second O-RU 132, and/or the third O-RU 134.

CCE utilization may be initially reserved for use by both the first tenant 110 and the second tenant 120. If one of the tenants does not utilize CCE, the nRT-RIC 108 may offload CCE utilization for the tenant, such as via the E2 interface. The nRT-RIC 108 may also monitor the PRB occupation and queue depth for the tenants periodically. The nRT-RIC 108 may receive the PRB occupation and queue depth from the first tenant 110 and the second tenant 120 via the E2 interface. The nRT-RIC 108 may dynamically adjust the PRB allocation assigned to the first tenant 110 and the second tenant 120 by evaluating the PRB occupation and queue depth for the first tenant 110 and the second tenant 120. Dynamic sharing of PRB will described in more detail herein with respect to FIG. 3.

Figure 2:
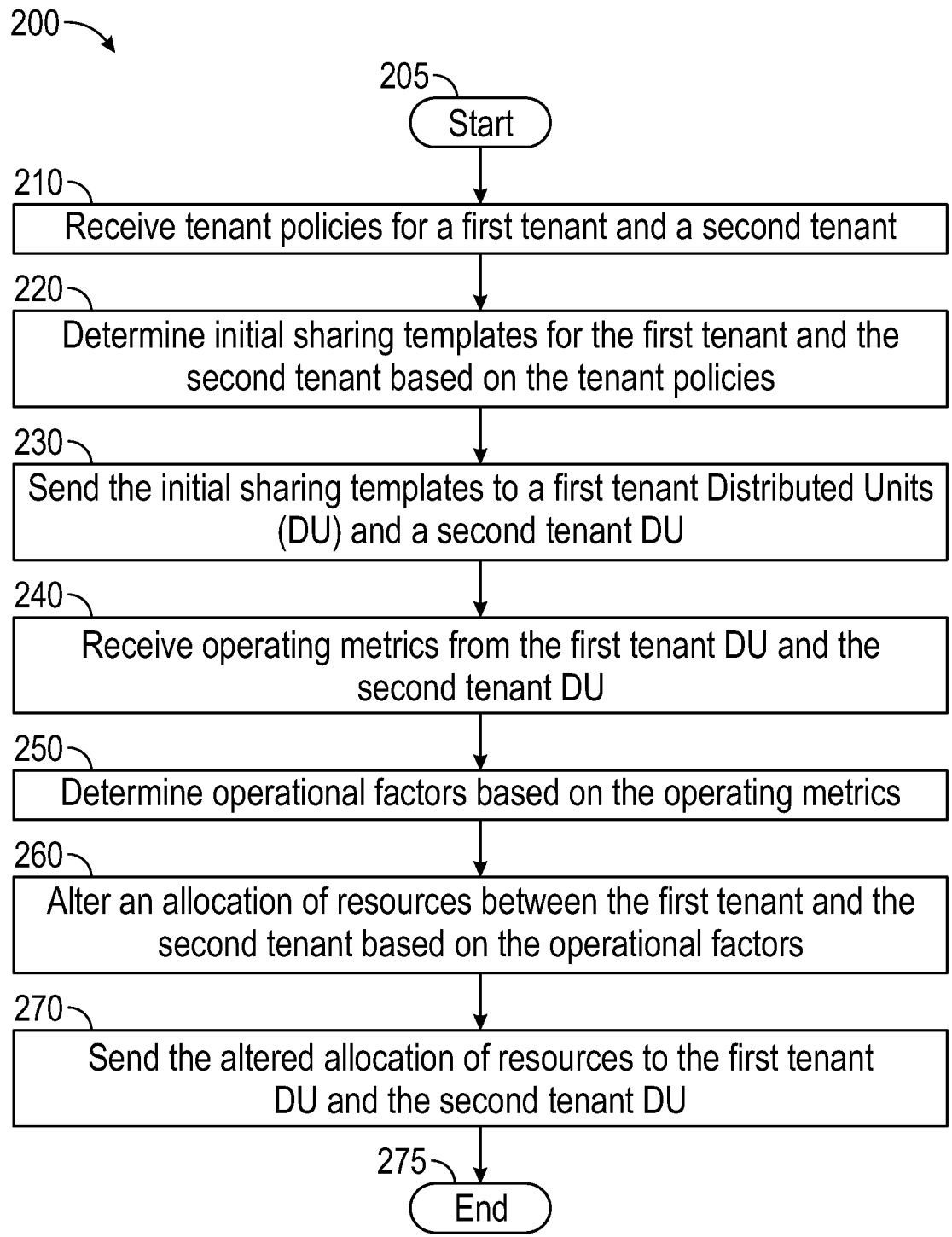
FIG. 2 is a flow chart of a method for providing dynamic O-RU sharing between multiple tenant O-DUs.

FIG. 2 is a flow chart of a method 200 for providing dynamic O-RU sharing between multiple tenant O-DUs. The method 200 may begin at operation 210, and tenant policies for a first tenant and a second tenant may be received. For example, the nRT-RIC 108 may receive the first tenant policy 102 and the second tenant policy 104 from the SMO 106.

In operation 220, initial sharing templates for the first tenant and the second tenant may be determined based on the tenant policies. For example, the nRT-RIC 108 may determine the initial sharing policies for the initial resource allocations of the first tenant 110 and the second tenant 120. For example, the nRT-RIC 108 may determine the resources the first tenant 110 and the second tenant 120 may use when interfacing with the first O-RU 130, the second O-RU 132, and/or the third O-RU 134 when determining the initial sharing templates.

In operation 230, the initial sharing templates may be sent to a first tenant DU and a second tenant DU. For example, the nRT-RIC 108 may send the initial sharing templates to the first tenant DU 114 and the second tenant DU 124. The first tenant DU 114 and the second tenant DU 124 may use the initial sharing templates to determine the resources the tenants can use, for example, when interfacing with the first O-RU 130, the second O-RU 132, and/or the third O-RU 134.

In operation 240, operating metrics from the first tenant DU and the second tenant DU may be received. For example, the nRT-RIC 108 may receive the operating metrics from the first tenant DU 114 and the second tenant DU 124. In operation 250, operational factors may be determined based on the operating metrics.

For example, the nRT-RIC 108 determines the operational factors using the operating metrics received in operation 240.

In operation 260, an allocation of resources between the first tenant and the second tenant may be altered based on the operational factors. For example, the nRT-RIC 108 may alter the resources the first tenant 110 and the/or the second tenant 120 may use when interfacing with the first O-RU 130, the second O-RU 132, and/or the third O-RU 134 based on the operational factors determined in operation 250.

In operation 270, the altered allocation of resources may be sent to the first tenant DU and the second tenant DU. For example, the nRT-RIC 108 may send the altered allocation of resources to the first tenant DU 114 and the second tenant DU 124. The altered allocation may be defined by altered sharing templates similar to the structure of the initial sharing templates. The nRT-RIC 108 and the first tenant DU 114 and the second tenant DU 124 may communicate using an E2 interface in the operations of the method 200.

Figure 3:
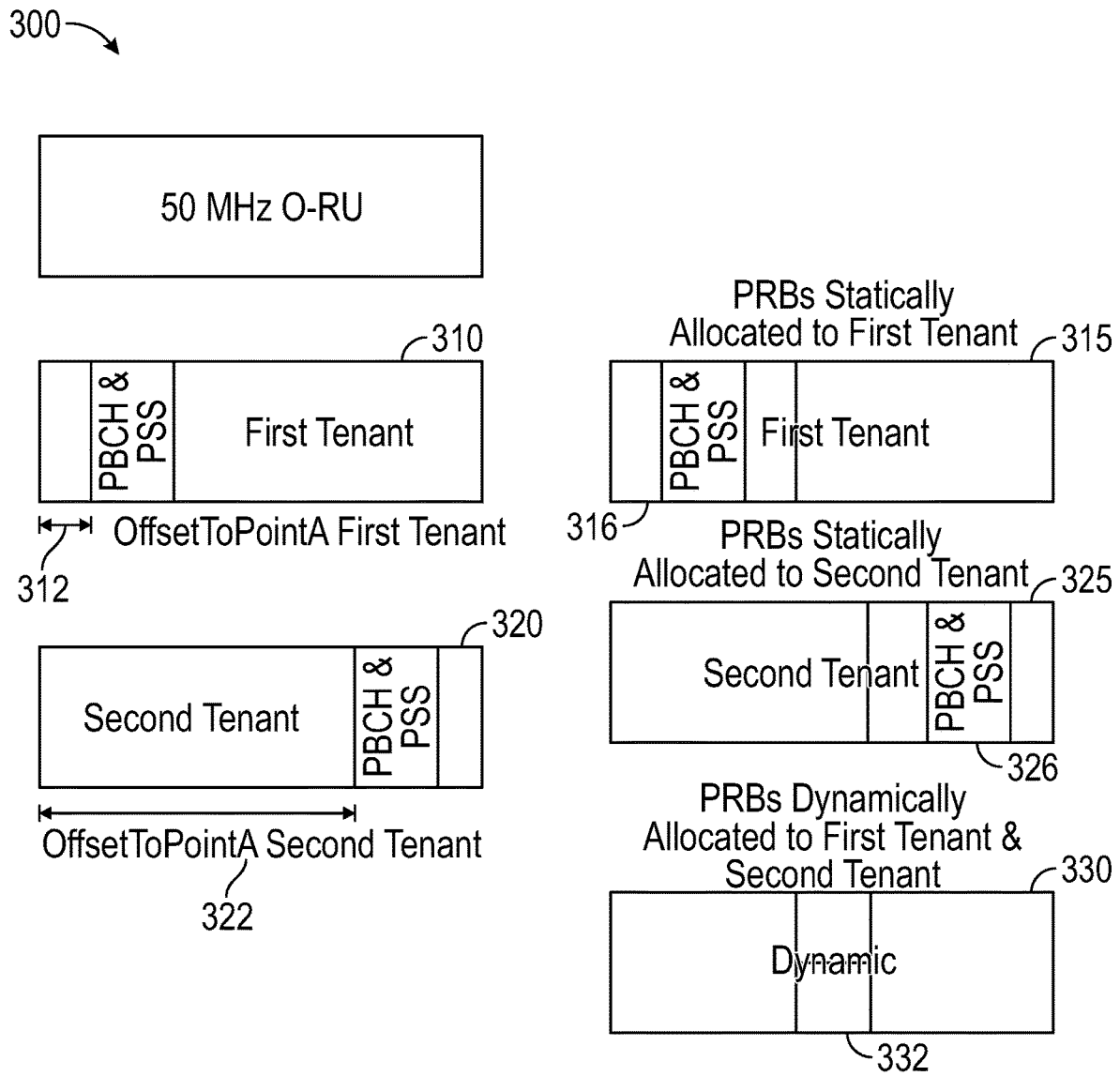
FIG. 3 is a block diagram of an example allocation of Physical Resource Block (PRB) resources between tenants.

FIG. 3 is a block diagram of an example allocation of PRB resources between tenants 300. The allocation of PRB resources between tenants 300 may include an O-RU (e.g., the first O-RU 130, the second O-RU 132, and the third O-RU 134) range of 50 MHz. The allocation of PRB resources between tenants 300 may include an initial first tenant allocation 310 a first tenant allocation 315, an initial second tenant allocation 320, a second tenant allocation 325, and a dynamic allocation 330. The initial first tenant allocation 310 may include a Physical Broadcast Channel (PBCH) and Primary Synchronization Signal (PSS) configuration for the first tenant 110. The first tenant allocation 315 may include the PBCHG and PSS configuration and a determined PRB allocation for the first tenant 110. Similarly, the initial second tenant allocation 320 may include a PBCH and PSS configuration for the second tenant 120, and the second tenant allocation 325 may include the PBCH and PSS configuration and a determined PRB allocation for the second tenant 120.

As described above, the nRT-RIC 108 may dynamically share a subset of available PRBs between a plurality of tenants, such as the first tenant 110 and the second tenant 120. The first tenant 110 and the second tenant 120 may have overlapping carriers, but each carrier may use a distinct PBCH and PSS configuration. The nRT-RIC 108 may determine a first tenant allocation offset 312 and a second tenant allocation offset 322 to determine non-overlapping PBCH and PSS configurations for the first tenant 110 and the second tenant 120. The nRT-RIC 108 may allocate each tenant a set of static resources that may be used for common and dedicated channels (e.g., the first tenant PBCH and PSS configuration with PRB allocation 316 and the second tenant PBCH and PSS configuration with PRB allocation 326) based on the first tenant allocation offset 312 and the second tenant allocation offset 322. However, the nRT-RIC 108 may reserve a subset of O-RU PRB resources, the dynamic resources 332, for the dynamic allocation 330 between the tenants. The nRT-RIC 108 may determine the allocation of these resources for a particular time duration between the first tenant 110 and the second tenant 120. The duration may be aligned with established "near real time" operations of the nRT-RIC 108, or the allocation may persist over some longer duration. The nRT-RIC 108 signaling information to the respective O-DU (e.g., the first tenant DU 114 and the second tenant DU 124) may allow the O-DU to use the dynamically allocated PRB resources, the dynamic resources 332 for example, for supporting operations. The nRT-RIC 108 may determine the allocation of the dynamic resources 332 based on the operating metrics, component and operation information, PRB occupations, queue depths, the first tenant allocation offset 312 and/or the second tenant allocation offset 322.

Figure 4:
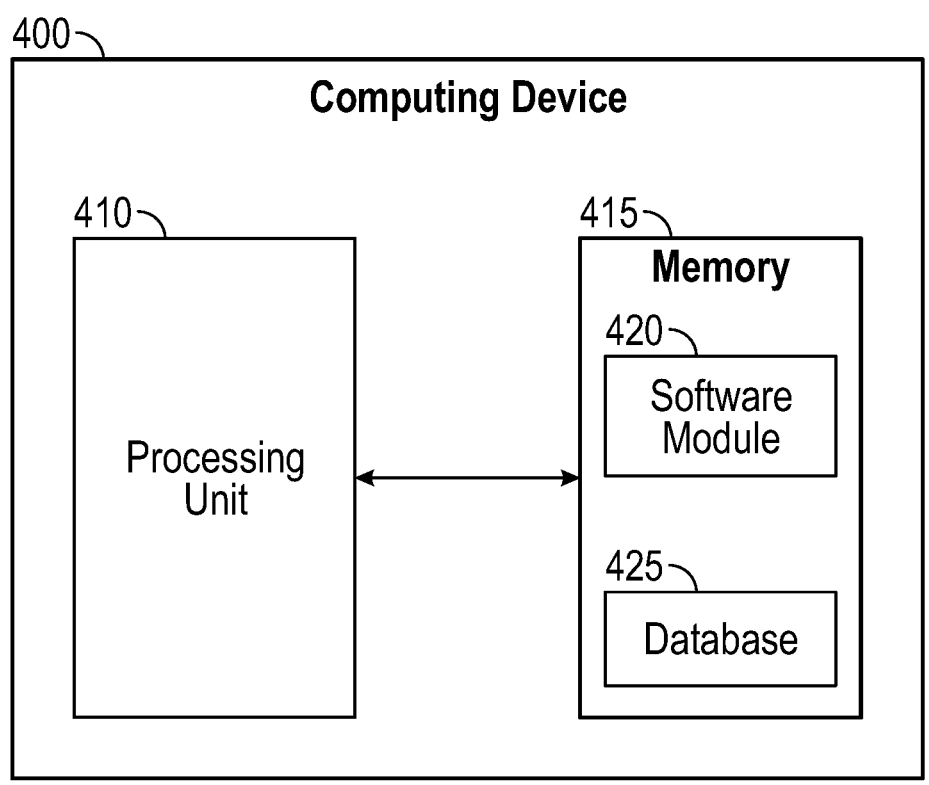
FIG. 4 is a block diagram of a computing device.

FIG. 4 is a block diagram of a computing device 400. As shown in FIG. 4, the computing device 400 may include a processing unit 410 and a memory unit 415. Memory unit 415 may include a software module 420 and a database 425. While executing on processing unit 410, software module 420 may perform, for example, processes for providing a dynamic O-RU sharing between multiple tenant O-DUs as described above with respect to FIG. 1, FIG. 2, and FIG. 3. Computing device 400, for example, may provide an operating environment for the SMO 106, nRT-RIC 108, the first tenant 110, the first tenant CU 112, the first tenant DU 114, the second tenant 120, the second tenant CU 122, the second tenant DU 124, the first O-RU 130, the second O-RU 132, the third O-RU 134, and/or any other system described herein. The SMO 106, nRT-RIC 108, the first tenant 110, the first tenant CU 112, the first tenant DU 114, the second tenant 120, the second tenant CU 122, the second tenant DU 124, the first O-RU 130, the second O-RU 132, the third O-RU 134, and/or any other system described herein may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, by a Near Real Time Radio Area Network Intelligent Controller (nRT-RIC), tenant policies for a first tenant and a second tenant;
determining, by the nRT-RIC, initial sharing templates for the first tenant and the second tenant based on the tenant policies, wherein determining the initial sharing templates for the first tenant and the second tenant based on the tenant policies comprises:
determining a first Physical Broadcast Channel (PBCH) and Primary Synchronization Signal (PSS) configuration for the first tenant and a first PRB allocation for the first tenant;
determining a second PBCH and PSS configuration for the second tenant and a second PRB allocation for the second tenant; and
determining a reserve PRB allocation;
sending, by the nRT-RIC, the initial sharing templates to a first tenant Distributed Unit (DU) and a second tenant DU;
receiving, by the nRT-RIC, operating metrics from the first tenant DU and the second tenant DU;
determining, by the nRT-RIC, operational factors based on the operating metrics, wherein determining the operating factors comprises determining Control Channel Element (CCE) utilizations for each of the first tenant and the second tenant;
altering, by the nRT-RIC, an allocation of resources between the first tenant and the second tenant based on the operational factors, wherein altering the allocation of resources between the first tenant and the second tenant comprises offloading a CCE for any of (i) the first tenant, (ii) the second tenant, or (iii) a combination of (i) and (ii) based on the CCE utilizations; and sending, by the nRT-RIC, the altered allocation of resources to the first tenant DU and the second tenant DU.

2. The method of claim 1, further comprising:
receiving, by the nRT-RIC, component and operation information,
wherein altering, by the nRT-RIC, the allocation of resources between the first tenant and the second tenant is further based on the component and operation information.

3. The method of claim 1, wherein the altered allocation of resources includes an altered sharing policy and an altered carrier and Physical Resource Block (PRB) allocation scheme.

4. The method of claim 1, wherein the initial sharing templates define an initial allocation of resources between the first tenant and the second tenant.

5. The method of claim 4, wherein the initial allocation of resources includes an initial sharing policy and a carrier and Physical Resource Block (PRB) allocation scheme.

6. The method of claim 1, wherein offloading the CCE comprises offloading the CCE via an E2 interface.

7. The method of claim 1, further comprising:
receiving PRB occupations and queue depths for the first tenant and the second tenant; and
adjusting the PRB allocations for the first tenant and the second tenant based on the PRB occupations and queue depths for the first tenant and the second tenant, wherein adjusting the PRB allocations comprises allocating the reserve PRB allocation to one of the first tenant and the second tenant based on the PRB occupations and queue depths for the first tenant and the second tenant.

8. A system comprising:
a memory storage; and
a processing unit coupled to the memory storage, wherein the processing unit is operative to:
receive tenant policies for a first tenant and a second tenant;
determine initial sharing templates for the first tenant and the second tenant based on the tenant policies, wherein the processing unit being operative to determining the initial sharing templates for the first tenant and the second tenant based on the tenant policies comprises the processing unit being operative to:
determine a first Physical Broadcast Channel (PBCH) and Primary Synchronization Signal (PSS) configuration for the first tenant and a first PRB allocation for the first tenant;
determine a second PBCH and PSS configuration for the second tenant and a second PRB allocation for the second tenant; and
determine a reserve PRB allocation;
send the initial sharing templates to a first tenant Distributed Unit (DU) and a second tenant DU;
receive operating metrics from the first tenant DU and the second tenant DU;
determine operational factors based on the operating metrics, wherein the processing unit being operative to determine the operating factors comprises the processing unit being operative to determine Control Channel Element (CCE) utilizations for each of the first tenant and the second tenant;
alter an allocation of resources between the first tenant and the second tenant based on the operational factors, wherein the processing unit being operative to alter the allocation of the resources between the first tenant and the second tenant comprises the processing unit being operative to offload a CCE for any of (i) the first tenant, (ii) the second tenant, or (iii) a combination of (i) and (ii) based on the CCE utilizations; and
send the altered allocation of resources to the first tenant DU and the second tenant DU.

9. The system of claim 8, wherein the processing unit is further operative to:
receive component and operation information,
wherein to alter the allocation of resources between the first tenant and the second tenant is further based on the component and operation information.

10. The system of claim 8, wherein the altered allocation of resources includes an altered sharing policy and an altered carrier and Physical Resource Block (PRB) allocation scheme.

11. The system of claim 8, wherein the initial sharing templates define an initial allocation of resources between the first tenant and the second tenant.

12. The system of claim 11, wherein the initial allocation of resources includes an initial sharing policy and a carrier and Physical Resource Block (PRB) allocation scheme.

13. The system of claim 8, wherein the processing unit being operative to offload the CCE comprises the processing unit being operative to offload the CCE via an E2 interface.

14. The system of claim 8, where the processing unit is further operative to:
receive PRB occupations and queue depths for the first tenant and the second tenant; and
adjust the PRB allocations for the first tenant and the second tenant based on the PRB occupations and queue depths for the first tenant and the second tenant, wherein adjusting the PRB allocations comprises allocating the reserve PRB allocation to one of the first tenant and the second tenant based on the PRB occupations and queue depths for the first tenant and the second tenant.

15. A non-transitory computer-readable medium that stores a set of instructions which when executed perform a method executed by the set of instructions comprising:
receiving tenant policies for a first tenant and a second tenant;
determining initial sharing templates for the first tenant and the second tenant based on the tenant policies, wherein determining the initial sharing templates for the first tenant and the second tenant based on the tenant policies comprises:
determining a first Physical Broadcast Channel (PBCH) and Primary Synchronization Signal (PSS) configuration for the first tenant and a first PRB allocation for the first tenant;
determining a second PBCH and PSS configuration for the second tenant and a second PRB allocation for the second tenant; and
determining a reserve PRB allocation;
sending the initial sharing templates to a first tenant Distributed Unit (DU) and a second tenant DU;
receiving operating metrics from the first tenant DU and the second tenant DU;
determining operational factors based on the operating metrics, wherein determining the operating factors comprises determining Control Channel Element (CCE) utilizations for each of the first tenant and the second tenant;

altering an allocation of resources between the first tenant and the second tenant based on the operational factors, wherein altering the allocation of the resources between the first tenant and the second tenant comprises offloading a CCE for any of (i) the first tenant, (ii) the second tenant, or (iii) a combination of (i) and (ii) based on the CCE utilizations; and sending the altered allocation of resources to the first tenant DU and the second tenant DU.

16. The non-transitory computer-readable medium of claim 15, further comprising:

receiving component and operation information, wherein altering the allocation of resources between the first tenant and the second tenant is further based on the component and operation information.

17. The non-transitory computer-readable medium of claim 15, wherein the altered allocation of resources includes an altered sharing policy and an altered carrier and Physical Resource Block (PRB) allocation scheme.

18. The non-transitory computer-readable medium of claim 15, wherein the initial sharing templates define an initial allocation of resources between the first tenant and the second tenant.

19. The non-transitory computer-readable medium of claim 18, wherein the initial allocation of resources includes an initial sharing policy and a carrier and Physical Resource Block (PRB) allocation scheme.

20. The non-transitory computer-readable medium of claim 15, wherein offloading the CCE comprises offloading the CCE via an E2 interface.

* * * * *